United States Patent [19]

Rönbeck

[11] 4,400,984
[45] Aug. 30, 1983

[54] HANDLING MECHANISM FOR A RECTILINEAR MOVEMENT WITH CONNECTING PERPENDICULAR MOVEMENT SEGMENTS AT THE ENDS

[75] Inventor: Arne I. Rönbeck, Olofström, Sweden

[73] Assignee: AB Volvo, Gothenburg, Sweden

[21] Appl. No.: 218,748

[22] Filed: Dec. 22, 1980

[30] Foreign Application Priority Data

Dec. 28, 1979 [SE] Sweden ................................ 7910725

[51] Int. Cl.³ ........................ F16H 21/44; B23Q 7/04
[52] U.S. Cl. ...................................... 74/103; 414/749
[58] Field of Search ................. 74/102, 103; 414/733, 414/737, 749, 751, 752, 753, 742, 917

[56] References Cited

U.S. PATENT DOCUMENTS

| 1,766,573 | 6/1930 | Westin | 414/733 |
| 1,959,512 | 5/1934 | Wall et al. | 414/752 |
| 2,496,000 | 1/1950 | Bugenhagen | 414/680 |
| 2,948,417 | 8/1960 | Haanes | 414/733 |
| 3,061,118 | 10/1962 | Halberstadt | 414/737 |
| 3,127,026 | 3/1964 | Blatt | 414/740 |
| 3,501,120 | 3/1970 | Daniel, Jr. | 74/103 |
| 3,680,881 | 8/1972 | Douglas | 74/103 |
| 3,902,606 | 9/1975 | Ronbeck | 414/733 |
| 4,289,040 | 9/1981 | Haluko | 414/749 |
| 4,295,780 | 10/1981 | Wada et al. | 414/749 |

FOREIGN PATENT DOCUMENTS

| 46-34158 | 10/1971 | Japan . |
| 52-37377 | 3/1977 | Japan . |
| 562338 | 6/1944 | United Kingdom | 74/103 |

Primary Examiner—Lawrence J. Staab
Attorney, Agent, or Firm—Young & Thompson

[57] ABSTRACT

A handling mechanism for making a gripping device perform a horizontal transport movement with connecting vertical raising and lowering movements at either end. A parallelogram linkage arrangement carrying the gripping device has one arm pivotally joined to the crank pin of a reciprocally pivoting crank. The upper end of the arm will follow a purely vertical path of movement by means of guides. Two cam follower rollers rotatable about the axis of the crank pin and abutting stationary cam curves impart a circle arc movement to the crank pin with connecting vertical movement segments at both ends, the crank being made in two pivoting parts so that its radius is variable. A device included in the handling mechanism selectively alters the length of stroke of the arm.

14 Claims, 8 Drawing Figures

HANDLING MECHANISM FOR A RECTILINEAR MOVEMENT WITH CONNECTING PERPENDICULAR MOVEMENT SEGMENTS AT THE ENDS

The present invention relates to a handling mechanism and particularly to a handling mechanism by means of which a working member is given a vertical raising and lowering movement at each end of a relatively long horizontal transport movement.

Such a mechanism is especially intended for feeding sheet metal pieces into or out of a press, for example for transferring pressed pieces from a press, either directly or via a conveyor belt or other conveyor means, to a subsequent press for continued pressing of the piece. The pieces must be lifted vertically out of the tool in the first press, and then be moved horizontally out of the press and be deposited on a conveyor means which moves the piece to a feeding position in front of the next press. The feed mechanism of this press must now lift the piece, transport it horizontally into the press and lower it onto the tool. It is of great importance that the lifting and especially the lowering movements be rectilinear vertically for correct placement of the workpieces on the respective tool and to prevent tool wear due to misalignment of the workpieces, which damages the edges of the tool. It is also essential that the lateral movement into and out of the press be rectilinear horizontally since the vertical space in presses is limited.

U.S. Pat. No. 3,902,606 discloses a handling device which achieves such an operating movement. In this mechanism the vertical raising and lowering movements at the ends of the horizontal movement are obtained by guiding the upper end of the arm supporting the work member into an arcuate path from its vertical path.

Primarily within the auto industry, but also in other industries, there is a great need for simple, light and thus inexpensive and easily cared-for handling aids which can perform this pattern of movement. When mechanizing pressing operations in small and intermediate-sized presses for example, the mechanization equipment should be easily movable from one press to another and be easily adaptable to various types of parts. For example, it is advantageous if the length of stroke of the mechanism can be easily changed as required. Furthermore the equipment should operate rapidly.

The purpose of the present invention is to provide a handling mechanism which satisfies these requirements in small and medium-sized presses even better than those previously known. According to the invention this is achieved by the handling mechanism in which the movement segments which are perpendicular to the middle segment are achieved by maintaining the other end of the arm in its straight path of movement, while the arcuate movement of the pivot point of the arm is broken off and replaced by rectilinear chords of a circle.

According to a preferred embodiment of the invention, the distance between the pivot axis of the crank and the crank pin is variable during said second movement segment and is adjusted by means of the guide means to be shorter than the radius of said arcuate path. This is preferably achieved by virtue of the fact that the crank has the characteristics first set forth below. Alternatively, the crank pin can be arranged to be movable in a guide in the longitudinal direction of the crank, or the crank can be made telescopic.

According to another embodiment of the invention, the pivot point of the arm is guided as a result of the fact that the guide means comprise both at least one cam follower arranged at the crank pin, and cam curves guiding the cam follower radially inside and outside the crank pin. In a handling mechanism in which the first movement segment is horizontal and the second runs vertically downwards from the first, this is achieved in a preferred embodiment of the invention by the characteristics set forth hereinafter. The maximum length of the crank can suitably be determined by a stop, acting between the parts of the crank, which limits the enclosed angle to a certain maximum value. The outer cam curve can thus be partially eliminated.

In an alternative to the distance between the pivot axis of the crank and the crank pin being variable, the guiding of the pivot point of the arm along the second path of movement (the chord) can be deflected by making the pivot axis of the crank movable parallel to the first movement segment. The crank is in this case rigid, and by displacement of the pivot axis of the crank the desired path of movement of the crank pin is achieved. The pivot shaft of the crank is supported by a pendulum journalled above or beneath said shaft, or alternatively the shaft can be arranged in a horizontal slide. For guiding the movement, the crank or crankshaft can suitably carry a cam which is guided in fixed cam followers in the form of rollers. Due to the fact that the upper end of the arm carrying the working member and the pivot point are both guided in parallel paths of movement during the raising and lowering movements, the arm carries out a purely translational movement in these segments. During the long first movement segment, however, the arm also pivots. This pattern of movement in the invention can be utilized with advantage to change simply the length of stroke of the working member, i.e. the length of the first movement segment. If the gear segment which is rotatably journalled in the connecting piece is made to rotate 180° during the first movement segment, it makes maximum change possible of the length of stroke at a given crank radius. Extension or shortening of the reciprocal movement can be achieved by setting an adjuster crank. The exact desired change in stroke length can be set by changing the radial distance between the adjuster crankshaft and the crank pin joined to the connecting rod. As an alternative to a gear segment, the displacing mechanism can comprise flexible member which transfer changes in the diagonal measure of the parallelogram mechanism via suitable pulleys to the slide carrying the working member.

The pattern of movement of the handling mechanism according to the invention permits, in a further development of the inventive idea, a balancing of the parts of the mechanism with spring means. When the first movement segment has a perpendicular second and third movement segment at either end, a very favourable harmonic movement and balance can be achieved. Since certain parts of the handling mechanism perform a purely linear movement, the balancing can alternatively be achieved by an arrangement of springs which cooperate with these parts.

The invention will be described below in more detail with the aid of an example and with reference to the accompanying drawings.

Figure 1:
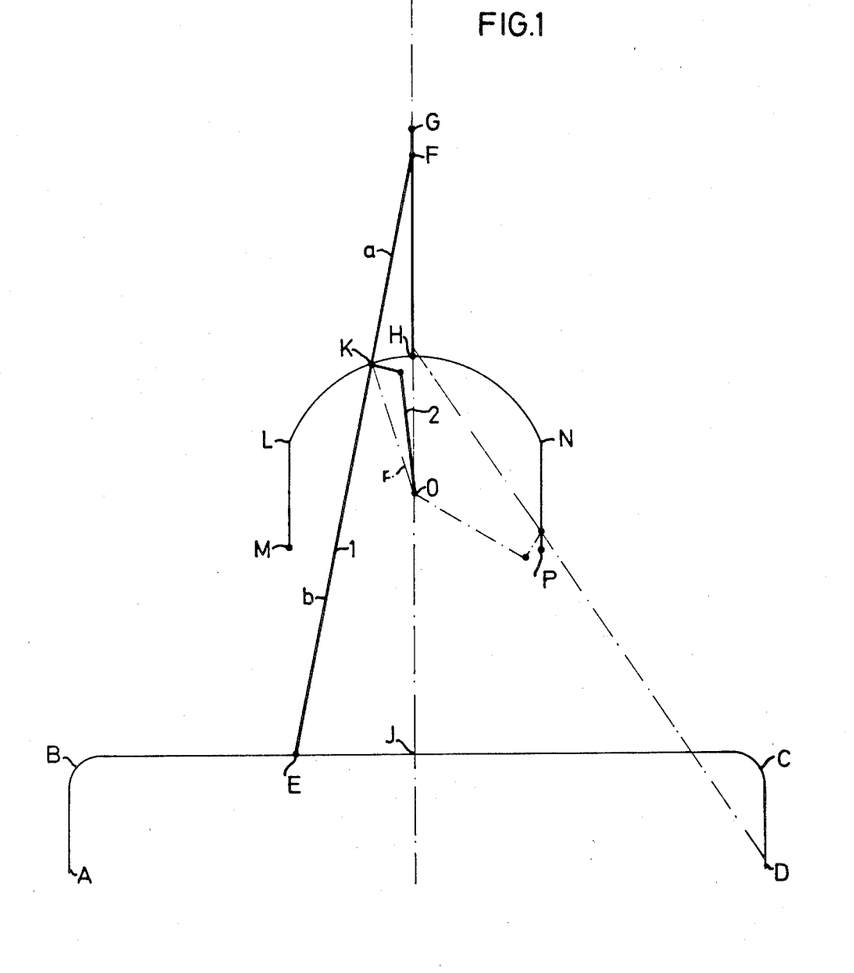
FIG. 1 shows schematically the handling mechanism and the pattern of movement of the working member and the pivot centre of the arm.
Figure 2:
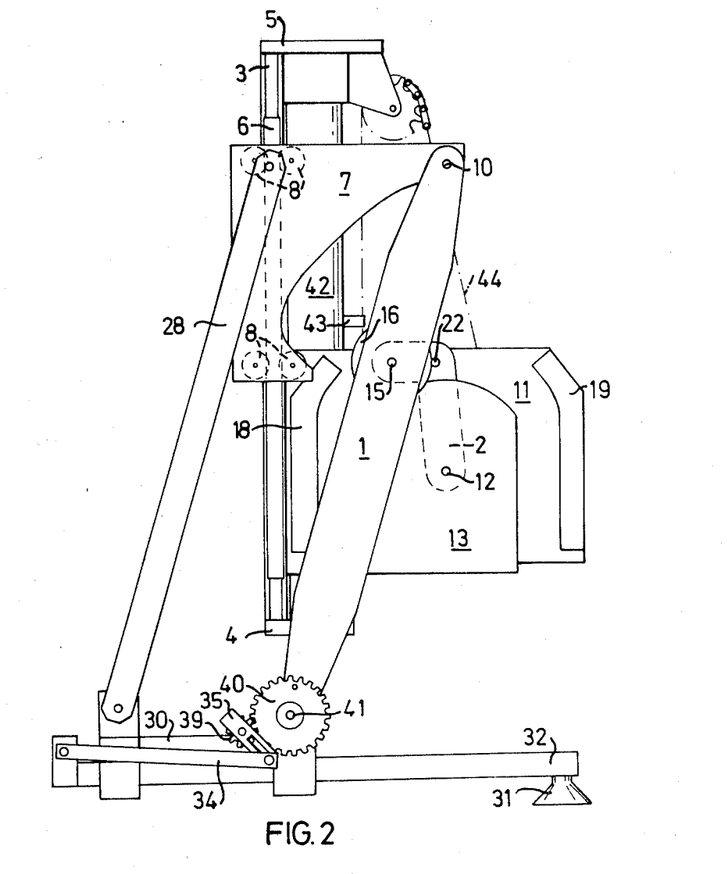
FIG. 2 shows a frontal view of a handling mechanism in the position shown with solid lines in FIG. 1.

FIG. 1 shows with the line ABCD the path of movement which is to be imparted to a holder for a sheet metal part for example, which is to be moved into or out of a hydraulic press. The portion BC is in this case a horizontal displacement movement at the ends of which the working member (in this case a holder) is to perform a vertical movement BA and CD respectively, to raise or lower, respectively, the sheet metal part. The holder is mounted at the lower end E of a straight arm 1, the upper end F of which is guided to follow a vertical path of movement GH. Directly beneath the path of movement GH, a crankshaft 0 is mounted which drives a crank 2. The outer end of the crank is pivotally jointed to the arm 1 at a point K on the same. The crank 2 consists of two pivotally joined parts, thereby permitting variation in the effective length of the crank. With the aid of guide means (not shown in detail in FIG. 1) the crank pin, i.e. the pivot point K of the arm 1, is moved along a path MLNP. The segment LN of this path consists of an arc with its centre at the centre 0 of the crankshaft and with the radius r. The pivot point K of the arm 1 has been placed so that it divides the arm 1 in an upper portion a (distance KF) and a lower portion b (distance KE). If the pivot point K is now caused to move along an arc with the radius r while the upper end F of the arm 1 follows the straight line GH, the lower end E of the arm will move in the manner known by Scott Russell's mechanism along an essentially straight line perpendicular to the line GH provided that the conditional equation $a = \sqrt{b \cdot r}$ is fulfilled. When the pivot point K at the ends L and N of the arc is made to move along a rectilinear vertical path LM and NP, and the upper end F of the arm 1 is still guided along the vertical path GH, the arm 1 will perform a purely vertical translation, so that the lower end E will follow the path segments BA and CD respectively. During these segments the distance between the pivot point K and the crankshaft 0 is less than the radius r, which is possible because the crank 2 is articulated and its two parts enclose between them a smaller angle than during the movement along the arc LN. FIG. 1 shows with dash-dot lines the arm approaching its right-hand end position at point D.

The transitions between the horizontal and the vertical movement segments for the lower end E of the arm 1 are shown rounded-off in FIG. 1 (at B and C), which is desirable to avoid jerking and rapid accelerations.

FIGS. 2–6 show in a simplified form an embodiment of a handling mechanism which is to perform the movement shown in FIG. 1. The mechanism is to be used in pressing for example, for transporting pieces into or out of a tool in a press. The entire mechanism is relatively small and light. It can be moved by two men and can stand by itself with the aid of a base (not shown) or can be hung on the press. The working member, i.e. the holder for the pieces, can be a suction cup device, schematically shown in FIGS. 2–4 as a single suction cup, but it can also be a magnet or a mechanical gripper. The mechanism has a frame which supports the actual arm mechanism, so that its upper points of attachment can perform a strictly vertical movement. This can be achieved in several ways with the aid of a post with a vertical guide and a traveller or slide cooperating therewith.

Figure 3:
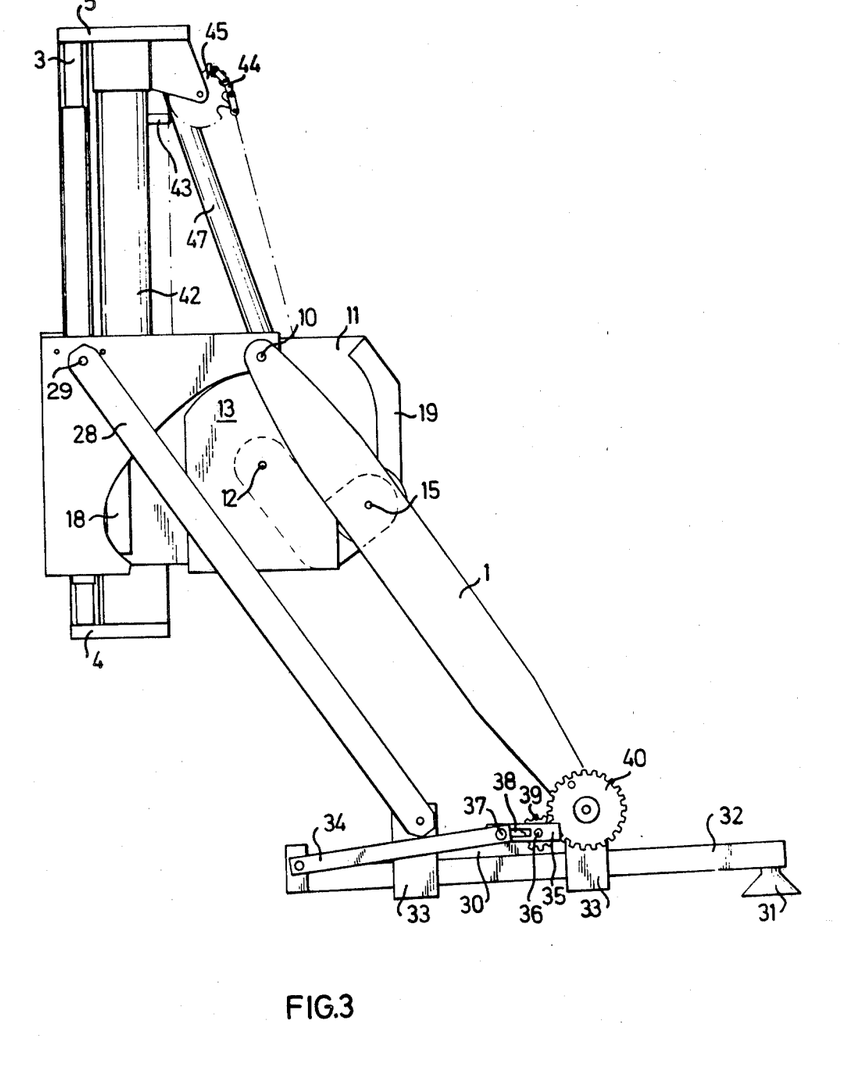
FIG. 3 shows a frontal view of a handling mechanism in the position shown with dash-dot lines in FIG. 1, FIGS. 4 and 5 show the handling mechanism as seen from the right side in FIGS. 2 and 3 and from the rear respectively.
Figure 4:
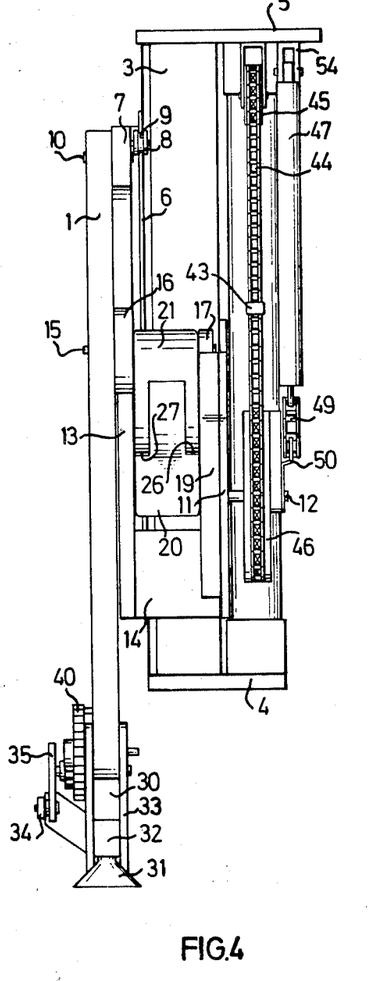

The figures show a simplified embodiment with a post 3 with lower and upper horizontal plates 4 and 5 respectively. The front (left-hand in FIG. 4) edge of the post 3 is provided with a vertical guide, shown as a guide rail. A traveller 7 in the form of a flat sheet is vertically movable along the guide 6, e.g. with the aid of an upper and a lower pair of rollers 8 rotatably attached to the traveller 7. The rollers 8 have grooves 9 in their peripheral surfaces. Thus each pair of rollers 8 grips over both opposing edges of the guide rail 6, thus not only guiding the traveller 7 vertically but also retaining it laterally, as seen in FIG. 4. The traveller 7 has a portion extending to the right in FIGS. 2 and 3, at the end of which the upper end of the arm 1 is pivotally joined with the aid of a shaft 10 running normal to the plane of the traveller 7.

At the rear right-hand corner of the post 3 as seen in FIG. 4, a bracket 11 is fixed parallel to the traveller 7. At a distance from the post 3, a horizontal shaft 12 is mounted perpendicular to the bracket 11. On the side of the bracket 11 facing the traveller 7, the shaft 12 carries the crank 2 described in connection with FIG. 1. The opposite end of the crankshaft 12 (to the left in FIG. 4) is mounted in a cam plate 13 which is parallel to the bracket 11 and is supported by the same by means of a lower horizontal spacer 14 (FIG. 4). The cam plate 13 lies essentially in the same plane as the traveller 7.

The outer end of the crank 2 carries a shaft 15 which forms the crank pin, with the aid of which the crank 2 is pivotally joined to the arm 1. Between the arm 1 and the crank 2, a roller 16 is rotatably mounted on the crank pin 15 and forms a cam follower and rolls against the outer contours of the cam plate 13. On the side of the crank 2 opposite the cam plate 13, the crank pin 15 carries a second roller 17 of smaller diameter. This roller 17 is also a cam follower and is disposed to be in contact, in a direction radially outwards from the crank pin 12, with two cam curves 18 and 19 arranged on the bracket 11. As can be best seen in FIG. 6, the crank 2 consists of two parts 20 and 21, which are pivotally joined to each other by a shaft 22 parallel to the crankshaft 12.

Figure 6:
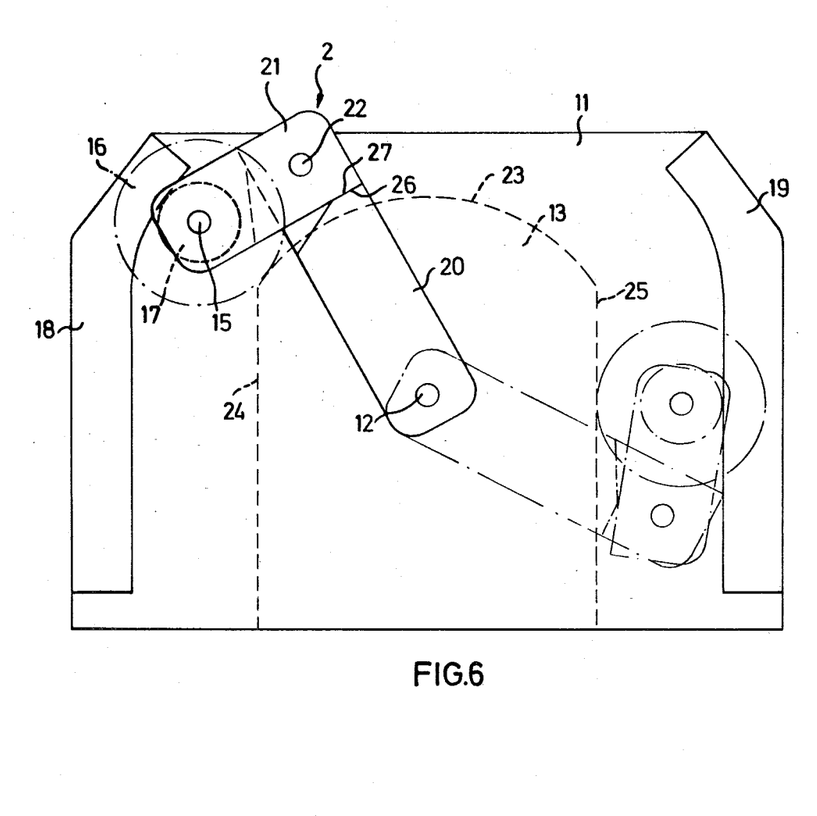
FIG. 6 shows in larger scale the portion around the crank, with certain portions cut away and the arm shown in two positions corresponding to FIGS. 2 and 3.

When the crank 2 is swung with the aid of the crankshaft 12, the roller 16 runs against the cam plate 13. As can be seen in FIG. 6, the cam plate has a cam curve, the middle portion 23 of which is an arc of a circle with the crankshaft 12 as the centre and vertical, rectilinear portions 24 and 25 on either side of the arc. When the roller 16 rolls against the arm 23, the crank pin 15 follows the arcuate movement LN shown in FIG. 1. When the roller 16 rolls against the vertical cam portions 24 and 25, the crank pin 15 follows the vertical paths of movement LM and NP respectively, shown in FIG. 1. The positions shown with solid lines and dash-dot lines, respectively, in FIG. 6 correspond essentially to the positions shown with solid lines and dash-dot lines in FIG. 1. The rounding-off between the horizontal and vertical movement segments for the lower end of the arm 1 can be increased by increasing the radius of the roller 16. The rounding-off of the movement can also be achieved by rounding off the cam curves themselves at the transitions. For the roller 16 to follow the vertical curve portions 24,25, the crank is guided radially from the outside with the aid of the curved paths 18,19 fixed to the bracket 11 and which act on the smaller roller 17 from the outside. Such a position is shown with dash-dot lines in FIG. 6 and corresponds to the position shown in FIGS. 3 and the position shown with dash-dot lines in FIG. 1. When the roller 16 rolls against the curved portions 24,25, the small roller 17 has swung in the outer crank part 21 so that the angle enclosed between the crank parts 20 and 21 is less than when the roller 16 rolls against the arcuate curve 23. To hold the roller 16 in contact with the arcuate curve 23, the outer cam curves 18, 19 fixed to the bracket 11 could be joined together at the top by means of an aruate portion against which the small roller 17 runs. To save weight in the mechanism, the bracket 11 and the cam curves 18,19 were not made so high as to form this arcuate portion. Instead the fact is utilized that the crank 2 has its greatest radius when the roller 16 runs against the arcuate curve 23. For this purpose the two crank parts 20,21 have interacting stop surfaces 26 and 27 respectively, which will be in contact with each other when the roller 16 is in contact with the arcuate curve 23.

Thus, the foldable crank 2 and the cam guide rollers 16,17 are able to provide the pivot point of the arm 1 the desired path of movement MLNP described in connection with FIG. 1. During this movement, the upper end (the shaft 10) of the arm 1 follows a rectilinear vertical path, controlled by the traveller 7 with the aid of the rail 6. The lower end of the arm 1 is thereby given the desired movement ABCD as shown in FIG. 1. The working member could in principle be attached to the lower end of the arm 1. It is however desirable to prevent the working member from pivoting together with the arm 1 during the horizontal movement (BC). For this purpose the handling mechanism is provided with a parallelogram linkage. A bar 28, parallel to the arm 1, is pivoted to the traveller 7 with the aid of a shaft 29 at the same vertical level as the shaft 10. The space between the ends of the arm 1 and the bar 28 corresponds to the space between the shafts 10 and 29 and they are pivotally joined to a horizontal connecting member 30. The bar 28 has the same length as the arm 1 so that the connecting member 30 is always kept horizontal. If the working member is attached to the connecting member, it can be thereby given a purely translational movement.

The handling mechanism shown in the drawings is provided with a device for changing the actual length of stroke of the working member, i.e. a shortening or extension of the movement segment BC shown in FIG. 1. The working member shown as a suction cup 31 is attached at the end of a horizontal slide 32 which is arranged to be displaceable in its longitudinal direction in a guide 33 which is carried by the connecting member 30. A connecting rod 34 is pivoted at one end to the opposite end of the slide 32 from the suction cup 31, and its other end is pivotally joined to a crank 35, the crankshaft 36 of which is rotatably journalled in the connecting member 30. The effective length of the adjuster crank 35, i.e the radial position of the pivot axis 37 forming the crank pin for the connecting rod 34, is adjustable in a suitable manner. The adjustment possibility is shown schematically in the drawing by a longitudinal slot 38 in the crank 35, along which slot the crank pin 37 can be moved and locked in the desired position by means of a clamping mechanism (not shown).

A small gear 39 is fixed to the crankshaft 36 and engages a gear sector 40 of larger diameter. Said sector is rigidly fixed to the arm 1 and has its centre at the shaft 41 by means of which the arm 1 is pivotally joined to the connecting member 30.

During the first movement section BC according to FIG. 1, the angle changes between the arm 1 and the connecting member 30. The gear sector 40 will thus cause the gear 39 to rotate, thus pivoting the crank 35. This movement is transmitted via the connecting rod to the slide 32, which is moved in the guides 33. The gear ratio between the gear section 40 and the gear 39 is selected so that the gear 39 rotates 180° between the two pivot end positions of the arm 1, i.e. at points B and C according to FIG. 1 prior to beginning the vertical movements. FIG. 3 shows the mechanism in the right-hand end position. As can be seen the adjuster crank 35 points to the left, thus pulling the slide 32 to the left from a neutral centre position. This means that the length of stroke for the suction cup 31 is reduced in comparison with the length of movement of the lower end of the arm 1. The mechanism is however adjustable so that the crank 35 can be adapted to point horizontally to the right when the mechanism assumes the position shown in FIG. 3. The slide 32 will thereby be displaced to the right from its neutral position and the length of stroke of the suction cup 31 will thus be increased in comparison with the movement of the arm 1. By adjusting the position of the crank pin 37 along the adjuster crank 35, the shortening or extension can be adjusted to obtain the exact desired length of stroke for the suction cup 31.

The mechanism is driven by a vertically standing compressed-air cylinder 42 between the upper and lower frame plates 5 and 4, respectively. The cylinder is of the type which has a piston pin 43 extending radially in a longitudinal slot (see especially FIG. 5). The piston 43 is securely fixed to a chain 44 one part of which runs over a pulley 45 suspended in the upper frame plate 5, and then it extends down around and into engagement with a sprocket 46 and then up again to the point of attachment for the chain on the piston pin 43. The sprocket 46 is non-rotatably fixed to a portion of the crankshaft 12 extending through the bracket 11.

By supplying compressed air to the cylinder 42 in a manner not shown in detail here, the piston pin 43 is given a vertical reciprocating movement. This movement is transmitted via the chain 44 to the sprocket 46 which in turn drives the crankshaft 12 and thus the crank 2. As can be seen in FIG. 1, the crank 2 must pivot more than 180° between its two end positions, and therefore the sprocket 46 should also be given a rotation of more than 180° between its end positions.

Figure 5:
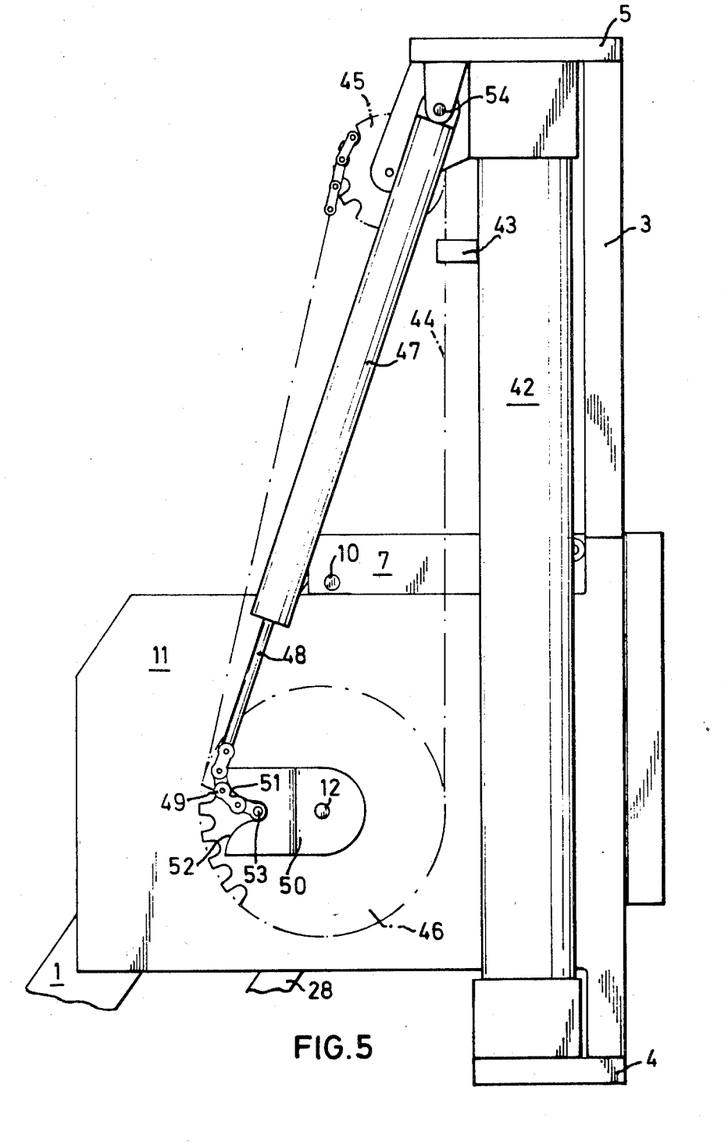

For balancing the mechanism, a compressed-air cylinder 47 is pivotally suspended from the upper frame plate 5 (FIG. 5). The piston rod 48 of the cylinder is joined at one end to a short chain 49, the other end of which is fixed to the sprocket 46. A cam body 50 is also mounted on the sprocket 46. It has two symmetrical cam curves 51,52 extending in opposite directions and disposed to interact with the chain 49. The piston chamber of the cylinder 47 communicates in a manner not shown here with an air accumulator. Thus the cylinder 47 operates as a pulling air spring with an essentially constant pulling force. The pressure in the air accumulator is adjustable by means of a pressure regulator (not shown) for adapting the spring force to various loads handled by the mechanism.

The balancing functions in the following manner. When the mechanism assumes the centre position, i.e. with the arm 1 vertical with the working member 31 midway between its end positions, the point 53 at which the chain 49 is attached to the sprocket 46 is on the line connecting the crankshaft 12 and the upper point of attachment 54 of the cylinder 47 to the frame plate 5. The piston rod 48 is then maximally retracted into the cylinder 47. The cylinder 47 has no moment arm in relation to the shaft 12 and therefore exerts no force which counteracts the movement of the mechanism. When the sprocket 46 under the influence of the chain 44 is caused to rotate in one direction from the centre position, the point of attachment 53 of the chain at a distance from the shaft 12 will pivot and pull out the piston rod 48 at the same time as the moment arm to the shaft 12 of the cylinder 47 increases. As the rotation of the sprocket 46 continues, one of the cam curves 51,52 of the cam body which rotates with the sprocket will start to come into contact with the chain 49 beginning with its radially innermost portion, thereby further increasing the extension of the piston rod 48 and the moment arm. During this process the cylinder 47 pivots about its upper point of attachment 54. FIG. 5 shows the state of the mechanism shortly before reaching the end position shown in FIG. 3. With the aid of the cam curves 51,52 and the chain 49 it is possible to gradually increase the extension of the piston rod 48 and the moment arm, thus increasing the spring force opposing the movement of the mechanism, all the way to the end positions of the mechanism in spite of the fact that the sprocket 46 rotates more than 180° between these end positions. The greatest spring force thus acts on the handling mechanism at its end positions and thereby balances the weight of the mechanism and the workpiece during the vertical movements. A slight overbalancing can be desirable.

Figure 7:
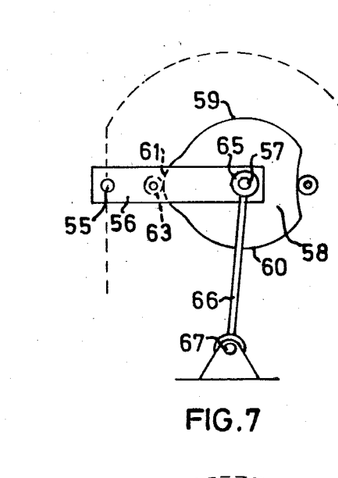
FIG. 7 shows an alternative embodiment of the handling mechanism with a displaceable crankshaft.

The invention is not limited to the embodiment described above and shown in FIGS. 1-6 but may comprise alternatives thereto within the scope of the accompanying claims. According to FIGS. 1-6 for example the crank radius r can be changed by virtue of the fact that the crank 2 consists of two pivoting parts 20,21. Another possibility for giving the crank pin shown in FIG. 1 the desired movement path MLHNP is to allow the length of the crank (the distance KO in FIG. 1) to be fixed and to make the crankshaft (0) laterally movable. FIG. 7 shows schematically portions of such a mechanism. The crank pin 55 is securely fixed to a rigid crank 56 which is non-rotatably joined to the crankshaft 57. A cam body 58 is arranged around the crankshaft 57 and is non-rotatably joined to the crank 56 and rotates with it. The cam body 58 has two cam curves 59,60 in the form of circular arcs located at the top and bottom in the position shown in FIG. 7. The curves 59,60 have the same radius and centre in the shaft 57. The portion of the cam body 58 next to the crank 56 has a convex cam curve 61, while the diametrically opposed portion of the cam body 58 has a slightly concave cam curve 62. The cam body 58 is guided between two cam follower rollers 63,64 securely mounted in a frame (not shown). The crankshaft 57 is rotatable in bearings 65 which are supported by an upright pendle arm 66 the lower end of which is in turn pivotally mounted about a shaft 67 supported by the frame and which is parallel to the crankshaft 57. The crank pin 55 can be connected to a parallelogram linkage mechanism in a manner corresponding to that shown in FIGS. 1-6, and the crankshaft 57 can be driven in the same manner as shown in these figures. When the crankshaft 57 is caused to rotate, the rollers 63,64 force the cam body 58 to move laterally when the rollers interact with the cam curve 61,62. This lateral movement is permitted by virtue of the pendulum suspension of the crankshaft 57. The crank pin 55 can thus be made to perform purely vertical movements corresponding to the movement segments LM and NP shown in FIG. 1. When the rollers 63,64 interact with the circle arcuate paths 59,60 of the cam body 58, the crankshaft 57 will be vertically above the pendulum mounting 67, and the crank pin 55 will perform a purely circular arcuate movement corresponding to the circular arc LN shown in FIG. 1.

Instead of the pendulum suspension of the crankshaft shown in FIG. 7 the crankshaft can be movable horizontally in suitable guides.

Figure 8:
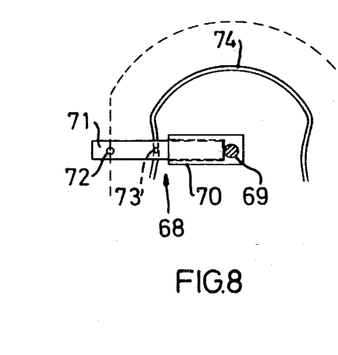
FIG. 8 shows an embodiment with a telescopic crank.

Alternatively, the crank pin can be movable along the crank of the crank can have variable length, for example by a telescopic construction. An example of this is shown in FIG. 8. The crank 68 consists of an inner member 70 made as a sleeve, which is non-rotatably joined to the crank 69. The outer member 71 of the crank is guided displaceably therein in the longitudinal direction of the crank. The outer member 71 carries the crank pin 72 and another pin 73 extending parallel with the crank pin. This pin 73 is guided in a curved path 74 which is rigidly mounted on the frame of the device.

The driving of the crankshaft can be accomplished in alternative methods to those shown in the drawings. For example, the compressed-air cylinder 42 and the chain 44 can be replaced by a second compressed-air cylinder which via a rack drives the sprocket 46, or the sprocket can be driven directly by a reversible motor with the aid of limit switches.

The balancing of the mechanism can also be arranged in other ways than that shown in the drawings. For example, a compression spring arrangement can be arranged between the lower frame plate 4 and the lower edge of the traveller 7. The spring arrangement should have such a characteristic that the spring force increases gradually but not sharply progressively towards the end positions of the arm 1, i.e. the bottom position of the traveller 7.

What I claim is:

1. Handling mechanism for imparting to a working member a reciprocal, essentially rectilinear, relatively long first movement segment, and a relatively short second movement segment connecting to the end of and running perpendicular to said first movement segment, especially a feeding mechanism with a horizontal transport movement and a vertical raising or lowering movement at either end thereof, the working member being carried by a first end of an arm, the other end of which being guided to follow a first path of movement perpendicular to the first movement segment, the arm being driven by a reciprocally pivoting crank, the pivot axis of which intersects an extension of said first path of movement and said crank being pivotally joined via a crank pin to the arm at a pivot point located on said arm, so that during said first movement segment when the point moves along a circular arcuate path of movement, the square of the distance between the pivot point of the arm and the other end of the arm is essentially equal to the product of the distance between the pivot point of the arm and the first end of the arm and the distance between the pivot point of the arm and the axis of the crank, characterized in that the crank pin is guided by guide means which during said second movement segment guide the pivot point of the arm along a second path of movement which is connected to the circular arcuate path and is rectilinearly parallel to the first movement path.

2. Handling mechanism as claimed in claim 1, characterized in that the distance between the pivot axis of the crank and the crank pin is variable during said second movement segment and is adjusted by guide means to be shorter than the radius of said circle arc path.

3. Handling mechanism as claimed in claim 2, characterized in that the crank comprises two pivotally joined parts which enclose between them a given angle when the pivot point of the arm moves along the circular arcuate path and a smaller angle when the pivot point of the arm moves along the second path of movement.

4. Handling mechanism as claimed in claim 3, characterized in that the maximum length of the crank is determined by means of stops acting between the crank parts which limit the enclosed angle to a given maximum value.

5. Handling mechanism as claimed in claim 2, characterized in that the guide means comprise a stationary guide means which interacts with a guide means carried by the crank and located between the crankshaft and the crank pin.

6. Handling mechanism as claimed in claim 5, characterized in that the guide means carried by the crank is a cam curve body securely fixed to the crank, and that the crankshaft is movable in the longitudinal direction of the crank within the range of said rectilinear second path of movement.

7. Handling mechanism as claimed in claim 5, characterized in that the portion of the crank located between the crankshaft and the guide means carried on the crank is made so that its length can be changed telescopically.

8. Handling mechanism as claimed in claim 1, characterized in that the guide means comprise firstly at least one cam follower arranged at the crank pin, and secondly cam curves placed radially inside and outside the crank pin.

9. Handling mechanism as claimed in claim 8, in which the first movement segment is horizontal and the second movement segment runs vertically downwards from the first, characterized in that the crank pin at the arm carries a cam follower in the form of a first roller; that a fixed frame next to the arm has a cam curve interacting with the first roller and located beneath and radially inside the path of movement of the roller; that a cam follower in the form of a second roller is arranged on the axis of the crank pin on the opposite side of the crank; and that the frame has on the opposite side of the crank from the arm a cam curve cooperating with the second roller and located radially outside the path of movement of the roller.

10. Handling mechanism as claimed in claim 1, characterized in that the arm is included in a parallelogram linkage arrangement comprising a bar parallel to the arm and two parallel connecting members which join the ends of the arm and bar in pairs and which are parallel to the first movement segment; that the working member is carried by a slide which is displaceable in guides joined to the connecting member which is carried by the first end of the arm; and that a displacing mechanism is arranged to convert the pivot movement occurring between the connecting members and the arm or the bar during the first movement segment into a rectilinear movement displacing the slide for increasing or reducing the length of stroke of the working member in relation to the first movement segment.

11. Handling mechanism as claimed in claim 10, characterized in that the displacement mechanism comprises firstly a first gear member securely fixed to the first end of the arm; secondly a second gear member rotatably mounted in the adjacent connecting member and engaging the first gear member; thirdly an adjuster crank securely fixed to the second gear member; and fourthly a connecting rod arranged between the adjuster crank and the slide.

12. Handling mechanism as claimed in claim 1, characterized in that the movement of the handling mechanism is balanced with the aid of spring means which counteract the movement with a force which is at a minimum when the arm is perpendicular to the first movement segment and which increases to a maximum at the end points of the movement.

13. Handling mechanism as claimed in claim 12, characterized in that a pull spring, preferably made as a pneumatic cylinder, is arranged between a stationary point of attachment for the spring and a movable point of attachment which is arranged on a member pivoting with the crankshaft in such a manner that the moment arm of the spring force is at a minimum at the centre of the first movement segment and increases in both directions from this centre position.

14. Handling mechanism as claimed in claim 1, in which said working member undergoes also a third movement segment parallel to the second movement segment at the opposite end of the first movement segment.

* * * * *